(12) United States Patent
Giletta

(10) Patent No.: US 9,284,703 B2
(45) Date of Patent: Mar. 15, 2016

(54) SPREADER UNIT FOR DE-ICING MATERIAL AND RESPECTIVE VEHICLE

(75) Inventor: Enzo Giletta, Revello (IT)

(73) Assignee: Giletta S.P.A. (IT)

( * ) Notice: Subject to any disclaimer, the term of this patent is extended or adjusted under 35 U.S.C. 154(b) by 171 days.

(21) Appl. No.: 13/806,393

(22) PCT Filed: Jul. 4, 2011

(86) PCT No.: PCT/IB2011/001553
§ 371 (c)(1),
(2), (4) Date: Apr. 5, 2013

(87) PCT Pub. No.: WO2012/001508
PCT Pub. Date: Jan. 5, 2012

(65) Prior Publication Data
US 2013/0193242 A1    Aug. 1, 2013

(30) Foreign Application Priority Data
Jul. 2, 2010    (IT) ............................... TO2010A0573

(51) Int. Cl.
*E01H 10/00* (2006.01)
*B60L 7/18* (2006.01)
*B60L 11/14* (2006.01)
*B60L 11/18* (2006.01)

(52) U.S. Cl.
CPC ............... *E01H 10/007* (2013.01); *B60L 7/18* (2013.01); *B60L 11/14* (2013.01); *B60L 11/1822* (2013.01); *Y02T 10/70* (2013.01); *Y02T 10/7005* (2013.01); *Y02T 10/7072* (2013.01); *Y02T 10/7077* (2013.01); *Y02T 90/124* (2013.01); *Y02T 90/14* (2013.01)

(58) Field of Classification Search
CPC ...... E01C 19/20; E01C 19/201; E01C 19/202; E01C 19/2025; E01C 19/203; E01C 19/2045; E01H 10/00; E01H 1/007; B60L 7/10; B60L 7/18; B60L 11/02; B60L 11/14; B60L 11/18; B60L 11/1809; B60L 11/1822; Y02T 90/10; Y02T 90/12; Y02T 90/124; Y02T 10/70; Y02T 10/7005; Y02T 10/7072; Y02T 10/7077
USPC .......................... 239/661, 670, 672, 673–680
See application file for complete search history.

(56) References Cited

U.S. PATENT DOCUMENTS

| | | | |
|---|---|---|---|
| 3,821,997 A * | 7/1974 | Sieren ........................... | 180/68.5 |
| 7,066,413 B2 * | 6/2006 | Musso et al. .................. | 239/722 |
| 2005/0121546 A1 | 6/2005 | Musso et al. | |

FOREIGN PATENT DOCUMENTS

| | | |
|---|---|---|
| EP | 0444467 | 9/1991 |
| EP | 1325984 | 7/2003 |
| FR | 2120528 | 8/1972 |
| JP | H049613 A | 1/1992 |
| JP | 2000000027 | 1/2000 |
| JP | 2009296716 | 12/2009 |
| WO | WO2008151203 | 12/2008 |

* cited by examiner

*Primary Examiner* — Christopher Kim
(74) *Attorney, Agent, or Firm* — Berenato & White, LLC

(57) ABSTRACT

A spreader unit for a de-icing substance to clear a road or pedestrian surface, comprises a hopper containing the de-icing substance, a spreader device that receives the de-icing substance from the hopper spreading the latter on the road or pedestrian surface, a carrying device to convey the de-icing substance of the hopper to the spreader device, a rechargeable battery to power the carrying device and an electric mechanical converter for charging the rechargeable battery transforming mechanical power.

18 Claims, 1 Drawing Sheet

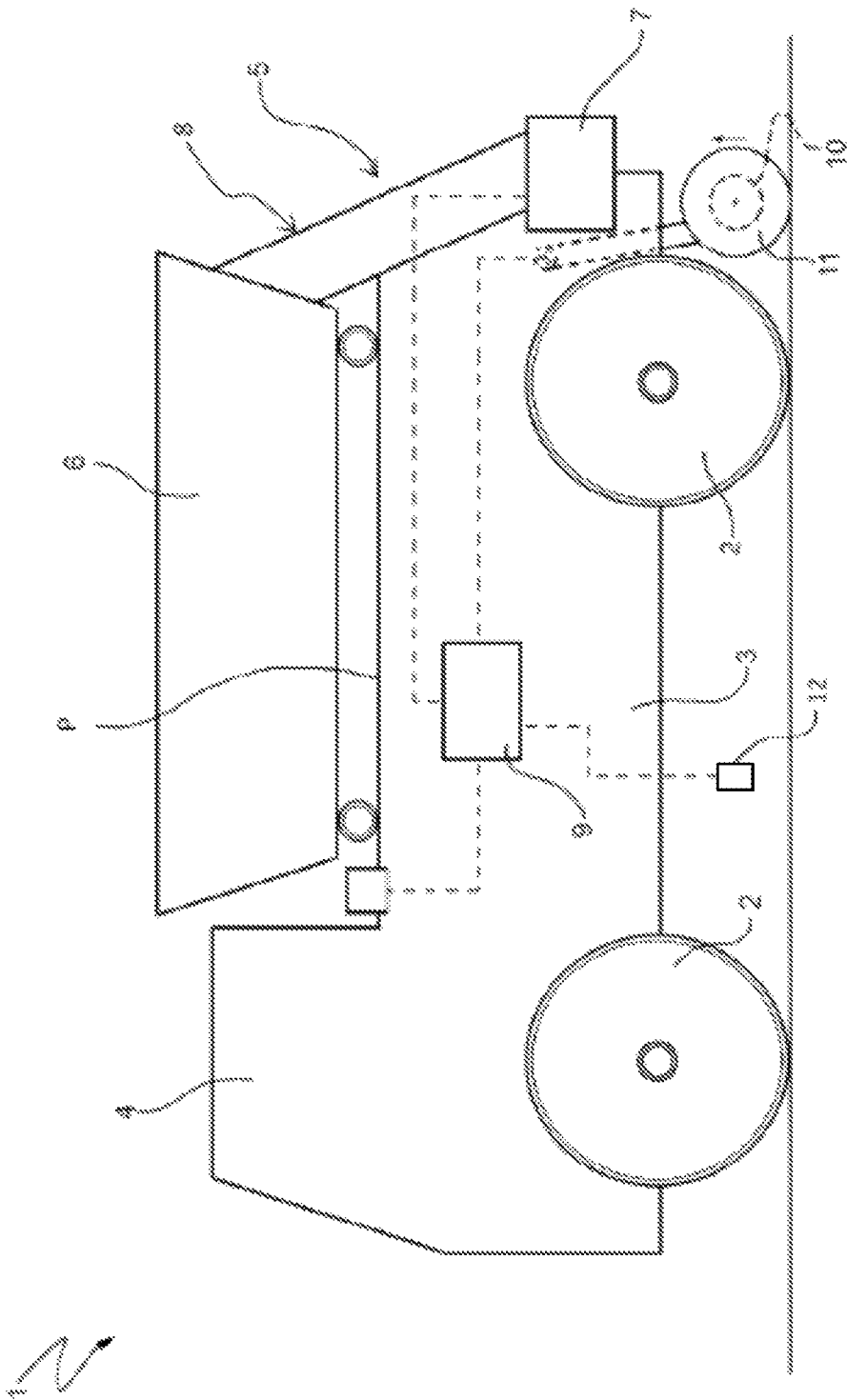

SPREADER UNIT FOR DE-ICING MATERIAL AND RESPECTIVE VEHICLE

CROSS-REFERENCE TO RELATED APPLICATIONS AND CLAIM TO PRIORITY

This application is a national stage application of International Application No. PCT/IB2011/001553, which claims priority to Italian Patent Application No. TO2010A000573 filed Jul. 2, 2010, of which the disclosures are incorporated herein by reference and to which priority is claimed.

TECHNICAL FIELD

The present invention relates to a spreader unit of a de-icing material configured to be mounted on a heavy vehicle. The spreader units are used for example for cleaning streets, highways, walkways, landings, take-off runways and parking areas, e.g., of logistics platforms for heavy wheeled transport vehicles.

BACKGROUND ART

It is known to provide a heavy vehicle with a spreader unit of a de-icing material comprising a hopper, one or more rotating spreaders related to the hopper, and one or more transport devices to gravitationally convey the de-icing material from the hopper to the spreader. The spreader also comprises a motor for driving a rotating disk that runs the spreading of the de-icing material. Normally, the carrying device and the motor of the spreader are connected to a pressurized hydraulic circuit for controlling the movable elements that process the de-icing material.

However, the hydraulic supply poses disadvantages associated with the use of the hydraulic fluid at very low temperatures. With such hydraulic supply, there are risks of partial or total solidification of the fluid in the conduits in case of, for example, long stops. In addition, the disposal of the hydraulic fluid has a significant impact on the environment. Also, the conduits are subject to corrosion and impact and can be damaged with high repair costs. Finally, the hydraulic system requires expensive drive systems such as power plugs from the vehicle or auxiliary engines or other similar systems.

In addition, a hydraulic circuit is usually sized based on the maximum load. In use, when the load is not at the maximum, the excess hydraulic power is dissipated resulting in wasted energy.

DISCLOSURE OF INVENTION

The purpose of the present invention is to provide a spreader unit of a de-icing material free from the above specified drawbacks.

Another purpose of the present invention is achieved by a spreader unit of a de-icing material that includes a hopper for containing de-icing material, a spreader device that receives the de-icing material from the hopper and spreads the de-icing material on a road or pedestrian surface, a carrying device for conveying the de-icing material from the hopper to the spreader device, at least one rechargeable battery for supplying power to the carrying device, and an electric mechanical converter for charging the rechargeable battery by an inputted mechanical power

BRIEF DESCRIPTION OF THE DRAWINGS

The invention will now be described with reference to the annexed drawing, which illustrates a non-limiting example of an embodiment, in which the FIGURE is a schematic side view of a heavy vehicle, comprising a spreader unit of a de-icing material according to the present invention.

BEST MODE FOR CARRYING OUT THE INVENTION

Indicated with reference numeral 1 in the FIGURE, as a whole, is a heavy vehicle. The heavy vehicle 1 includes at least four tires (or wheels) 2 mounted on two axles and a frame 3. An internal combustion engine or also an electric motor (not shown) drives the tires 2 and is mounted on the frame 3.

The frame 3 also has a compartment laterally defined by the body of a driving cab 4 and interiorly towards the tires 2 by support means (not shown in detail) defining the respective releasable connections and arranged on a load surface.

On the vehicle 1 can be mounted with suitable support means a spreader unit 5 of a de-icing or abrasive material. The spreader unit 5 includes at least a hopper 6 fixed to the frame 3 by way of support means, one or more spreaders 7 for the de-icing material, and one or more carrying devices (also referred to herein as carrying assemblies) 8 to convey the de-icing material from the hopper 6 to the spreader 7. Preferably, the carrying assembly 8 is electrically powered and comprises either a belt or chain conveyor or a dosing screw or similar systems and a rotating electric motor (not shown) to drive a rotating disc of the spreader 7 if the de-icing material is granular or partially granular. Alternatively, when the de-icing material is substantially fluid, the carrying assembly 8 includes at least a fluidic electric pump and a plurality of conduits directed towards the spreader 7, which in turn includes at least one spreading disk and/or nozzle.

The spreader unit 5 of the de-icing material also includes at least an electrical power unit to drive the carrying device 8. In particular, the electrical power unit includes at least a rechargeable battery 9 connected to the carrying device and a mechanical-electrical converter 10, such as a dynamo, connected to the rechargeable battery 9. In particular, according to the present invention, the dynamo 10 is driven, preferably by way of a transmission, by a movable friction wheel to selectively contact one of the tires 2. Preferably, the friction wheel 11 is moved by an actuator (not shown) to perform a trajectory between two end-run positions. In the first position the friction wheel 11 is connected with the tire 2 to transfer torque. In the second position, the friction wheel 11 is disconnected from the tire 2. Electric drives and controls can also be provided to check and eventually convert the voltage between the dynamo 10, the batteries 9 and the carrying assembly 8.

According to a further embodiment, the friction wheel 11 is configured to directly contact the road surface.

Conveniently, the actuator also is designed for this operation mode.

According to a preferred embodiment of the present invention, the spreader unit 5 of a de-icing material is configured as a kit to be mounted/dismounted on a heavy vehicle 1 already on the market. In particular, the unit 5 includes at least a rigid structure to which the hopper 6, the spreader 5, the carrying device 8, the batteries 9 and the dynamo 10 are attached with the friction wheel 11. The rigid structure is mounted and dismounted from the loading surface of the vehicle 1.

Alternatively, the friction wheel 11 and the respective actuator can be directly mounted onto the spreader structure, or on the frame 3. In this case power cables are provided with fast electrical connections to connect-disconnect the dynamo 10 and the spreader 7.

In use, the spreader unit 5 is fixed on the vehicle 1 by way of fastening means including at least flexible elements such as belts and/or chains, so that the friction wheel 11 is in torque transfer contact to drive the dynamo 10 when it is in the first position. In particular, the dynamo 10 is mounted on the actuator and is also mobile as the wheel 11. Preferably the dynamo 10 and the wheel 11 are in a relative fixed position upon the actuator.

During vehicle movement, the user can automatically control the position of the friction wheel 11, i.e. the first or the second position, in order to charge the battery 9 or to disconnect the dynamo 10 from the wheels or from the road. In particular, position control of the wheel 11 can be manually operated by the driver who can activate the movement of the actuator directly from the cab. Alternatively, position control of the wheel 11 can be directly controlled by an electronic control unit that controls the activation of the actuator to charge the battery 9 when the charge level of the battery 9 falls below a preset value.

Benefits of the spreader unit 5 are the following.

Through the use of friction wheel 11 connected to the dynamo 10 it is possible to charge the battery 9 to drive the carrying device 8 and therefore allow the spreading of the de-icing and abrasive materials. In addition, a carrying device 8 and relative batteries 9 are sized to provide sufficient power for the complete operation of the spreader unit 5 with no impact on the autonomy of the vehicle 1. In particular, the electric power required to operate the carrying device 8 is such that the batteries 9 are dedicated to the same carrying device. The batteries of the vehicle 1 that feed the starter motor, the internal and external light circuit of the vehicle, the dashboard and the electronic devices for the operation of the internal combustion engine would not be able to provide such power.

By way of the electronic power supply, it is possible to increase the reliability of the spreader unit 5, as it ensures the work torque in all conditions and operating temperatures.

A low-noise spreader unit can be also mounted on electric or silenced vehicles for the night shift in populated centers.

Finally, it appears clear that to the unit 1 described and shown herein changes and variations can be made without extending beyond the protective scope as defined by the attached claims.

According to a further embodiment, the dynamo 10 is connected directly to a power plug of the vehicle 1. For example, the power plug is arranged in the vicinity of the combustion engine at the end of the platform facing the rear of the drive cab 4.

It is also possible that the controls and electric drives include at least a plug 12 for connecting the rechargeable batteries 9 directly to an electric network so that the batteries are recharged when the vehicle 1 is parked in a garage.

In addition, the batteries 9 are mounted in a dismountable way and preferably by means of a quick coupling. In this way, it is possible to replace dead batteries with charged batteries by the network without stopping the vehicle 1 for too long.

The invention claimed is:

1. A spreader unit for a de-icing material for cleaning a road or pedestrian surface, comprising:
    a hopper configured to contain the de-icing material;
    a spreader device configured to receive the de-icing material from said hopper and spread the de-icing material on the road or pedestrian surface;
    a carrying device configured to convey the de-icing material from said hopper to said spreader device;
    at least one rechargeable battery configured to supply electric power to said carrying device;
    an electric mechanical converter configured to charge said rechargeable battery by an inputted mechanical power; and
    a friction wheel configured to transfer the inputted mechanical power to the electric mechanical converter, wherein said friction wheel is movable between a first position and a second position, and wherein in said first position said friction wheel comes into direct contact with the road or pedestrian surface.

2. The spreader unit according to claim 1, wherein said electric mechanical converter and said friction wheel are movable together.

3. The spreader unit according to claim 1, wherein said rechargeable battery is disconnectable to receive a replacement charged battery when said rechargeable battery is discharged.

4. The spreader unit according to claim 1, wherein said rechargeable battery is adapted to plug into an electrical network to charge said rechargeable battery.

5. The spreader unit according to claim 1, wherein said electric mechanical converter is configured to charge said rechargeable battery when a charge level of said rechargeable battery falls below a preset value.

6. A spreader unit according claim 1, wherein said carrying device and said rechargeable battery are dedicated to supply electrical power only to said spreader unit for complete operation of said spreader unit.

7. A spreader unit according to claim 1, wherein said friction wheel is configured to drive said electric mechanical converter in the first position, and wherein in the second position said friction wheel is out of direct contact with the road or pedestrian surface so as to not drive said electric mechanical converter in the second position.

8. A spreader unit according to claim 1, wherein said carrying device and said rechargeable battery are sized to supply sufficient power to said spreader unit for complete operation of said spreader unit with no impact on the autonomy of the vehicle, and wherein the rechargeable battery is dedicated to providing electrical power to said carrying device.

9. A combination comprising:
    a vehicle for driving over a road or pedestrian surface, the vehicle having a power source; and
    a spreader unit according to claim 1 carried by said vehicle for spreading a de-icing material for cleaning the road or pedestrian surface.

10. A spreader unit for a de-icing material for cleaning a road or pedestrian surface, comprising:
    a hopper configured to contain the de-icing material;
    a spreader device configured to receive the de-icing material from said hopper and spread the de-icing material on the road or pedestrian surface;
    a carrying device configured to convey the de-icing material from said hopper to said spreader device;
    at least one rechargeable battery configured to supply electric power to said carrying device;
    an electric mechanical converter configured to charge said rechargeable battery by an inputted mechanical power; and
    a friction wheel configured to transfer the inputted mechanical power to the electric mechanical converter, wherein said friction wheel is movable between a first position and a second position, and wherein in said first position said friction wheel comes into direct contact with a tire of a vehicle on which said spreader unit is carried.

11. The spreader unit according to claim 10, wherein said electric mechanical converter and said friction wheel are movable together.

12. The spreader unit according to claim 10, wherein said rechargeable battery is disconnectable to receive a replacement charged battery when said rechargeable battery is discharged.

13. The spreader unit according to claim 10, wherein said rechargeable battery is adapted to plug into an electrical network to charge said rechargeable battery.

14. The spreader unit according to claim 10, wherein said electric mechanical converter is configured to charge said rechargeable battery when a charge level of said rechargeable battery falls below a preset value.

15. A spreader unit according claim 10, wherein said carrying device and said rechargeable battery are dedicated to supply electrical power only to said spreader unit for complete operation of said spreader unit.

16. A spreader unit according to claim 10, wherein said friction wheel is configured to drive said electric mechanical converter in the first position, and wherein in the second position said friction wheel is out of direct contact with the tire of the vehicle so as to not drive said electric mechanical converter in the second position.

17. A spreader unit according to claim 10, wherein said carrying device and said rechargeable battery are sized to supply sufficient power to said spreader unit for complete operation of said spreader unit with no impact on the autonomy of the vehicle, and wherein the rechargeable battery is dedicated to providing electrical power to said carrying device.

18. A combination comprising:
a vehicle for driving over a road or pedestrian surface, the vehicle having a power source; and
a spreader unit according to claim 10 carried by said vehicle for spreading a de-icing material for cleaning the road or pedestrian surface.

* * * * *